UNITED STATES PATENT OFFICE.

WILLIAM F. RUDEL, OF AURORA, INDIANA, ASSIGNOR TO ALBERT T. GRIDLEY, OF AURORA, INDIANA.

ART OF MAKING STARCH.

No. 810,086.  Specification of Letters Patent.  Patented Jan. 16, 1906.

Application filed February 15, 1905. Serial No. 245,699.

*To all whom it may concern:*

Be it known that I, WILLIAM F. RUDEL, a citizen of the United States of America, and a resident of Aurora, county of Dearborn, State of Indiana, have invented certain new and useful Improvements in the Art of Making Starch, of which the following is a specification.

My invention relates to the manufacture of chemical starch from corn. Its object is to produce a greater percentage of starch from the corn than is obtained by the processes now in common use and also to prevent waste and bad odors from fermentation and free the starch when completed from the chemicals used in its production.

In carrying out my process I use the same machinery and appliances that are now in common use, but subject the material to different treatment and tests while it is passing from the corn to the finished starch, all of which will be clearly understood from the following description and annexed claims.

In carrying out my process I first steep the corn for about thirty-six hours in water kept at a temperature of from 150° to 160° Fahrenheit, after which the corn is ground and the hull separated from the crude milk and conveyed to the tubs in the usual manner. I then add to the mash caustic soda until it will titrate twelve ten-thousandths ($\frac{12}{10000}$) to prevent fermentation for the length of time it remains in the tubs. The liquid then goes on to the runs to separate the starch from the slop and glutens, after which it is shoveled up and put back again into the tubs, having gained in the solid about eleven ten-thousandths, ($\frac{11}{10000}$,) making it titrate twenty-three ten-thousandths, ($\frac{23}{10000}$.) I now add sufficient water to again bring it to the liquid state. This will reduce the percentage of chemicals to about eight ten-thousandths, ($\frac{8}{10000}$.) The exact amount I test by again titrating it and then add enough chemicals (caustic soda) to make the liquid titrate thirty ten-thousandths, ($\frac{30}{10000}$.) The process will work between twenty-five and thirty-nine ten-thousandths. It is then run into the perforated molds or boxes and left to settle over night or until it comes to the proper consistency to be conveniently removed from the boxes or molds in cubes of about eight inches It is then conveyed to the crusting-room, heated to a temperature of from 190° to 250° Fahrenheit, and left in the crusting-rooms from ten to twelve hours or until a crystallized scale of about one-sixteenth of an inch is formed on the cubes. It is then removed, scraped, and broken into cubes of about one inch and conveyed to the drying-room. I then titrate to determine the percentage of chemicals, which, if properly treated according to my process, should titrate about thirty-six ten-thousandths, ($\frac{26}{10000}$.) It should be left in the drying-room about nine days, the length of time required to properly dry it for the market. This I determine by testing it until it will titrate five ten-thousandths ($\frac{5}{10000}$,) when it is removed, and by cooling it will lose its five ten-thousandths of caustic soda and be free from chemicals and perfectly harmless as food and not injurious to textiles upon which it is used.

In the manufacture of starch as now carried on much of it is lost by fermentation, owing to the fact that an insufficient quantity of caustic soda is used, and if too much is used some of it will remain in the starch after it is ready for the market, and as the chemical is poisonous if used as food and is very injurious to textiles it may be used upon it is important that the exact amount of caustic soda in the starch should be known at each step of the process. I have prepared an absolute test for detecting the presence of caustic soda and the exact percentage of it that is in the starch at any time. To neutralize the soda, I use a standard fluid one-fourth normal. To prepare this, I take ten grains of sulfuric acid and three hundred grains of water, allow them to stand separate in the open air for about ten hours or until both are of the same temperature, when they are mixed together. I then take the standard bicarbonate of soda and with a graduated burette make ten grains of the sulfuric acid equal ten grains of the bicarbonate of soda. I know then that I have a standard fluid, and ten per cent. of this fluid will neutralize ten per cent. of caustic soda. As a reaction I add one grain of phenolphthalein to one gallon of alcohol. This will turn caustic soda red, and the one-fourth normal or standard fluid above named will completely neutralize the caustic soda.

To determine the percentage of caustic soda in the starch at any stage of the process, a given quantity of the starch is measured if in the liquid state, and if in the dry state weighed, and a sufficient quantity of water added to it to bring it to the liquid state. A given quantity of the phenolphthalein is added to the starch, and then the standard fluid is added by a graduated burette until the starch is brought back to its white color, when it is known that the caustic soda has been neutralized, and the amount of standard fluid used determines the percentage of caustic soda in the starch. The percentage being known, it is only necessary to determine the amount of starch in the tub to determine how much caustic soda must be added to it to bring it to the proper condition to be passed over the runs. The same test is made while the starch is undergoing the drying process by taking one of the small cubes and testing it, and when it is found that the percentage of caustic soda is only five ten-thousandths ($\frac{5}{10000}$) it is known that the starch when dry will be perfectly pure.

By this process I am enabled to obtain not less than thirty-two pounds of starch from a bushel of corn, the time required to make the starch is much less, and no starch is spoiled in the manufacture.

I have found by experience that no given amount, by weight, of caustic soda added at any stage of the process will give any certain percentage of the alkali to the starch liquor, as liquor from different kinds of grain contain some more and some less acids which would neutralize a percentage of the soda; but by testing the liquor by my process I am always certain of bringing it to the proper condition to secure the best results by separation of the starch from the gluten and also leaving the starch when finished entirely free from the alkali.

What I claim is—

1. In the manufacture of chemical starch from corn, adding to the milk or liquor after it is separated from the hulls caustic soda until the liquor will titrate about twelve ten-thousandths ($\frac{12}{10000}$), then after the starch has been separated from the gluten and settled upon the runs, placing it in the washing-tubs, bringing it again to the liquid state and again adding caustic soda to the liquor until it titrates about thirty ten-thousandths ($\frac{30}{10000}$) and finally removing it from the ovens when the caustic soda in the lumps has been reduced to not more than five ten-thousandths ($\frac{5}{10000}$), substantially as hereinbefore set forth.

2. The method, substantially as herein described, for manufacturing starch from corn, which consists of the following steps: First steeping the corn in hot water at a temperature of from 150 to 160° Fahrenheit, then grinding the corn and separating the hulls from the milk, then adding caustic soda to the milk until it titrates about twelve ten-thousandths ($\frac{12}{10000}$), passing the milk so saturated over the runs to separate the starch from the slop and gluten, then placing the settled starch in the washing-tubs, adding sufficient water to bring it to the liquid state and again adding caustic soda until the fluid titrates about thirty ten-thousandths ($\frac{30}{10000}$), then running the liquor into settling-boxes and allowing it to settle for twelve hours or until it is ready for the crusting-room.

WILLIAM F. RUDEL.

Witnesses:
 ALBERT T. GRIDLEY,
 WALTER F. MURRAY.